E. J. McCLELLAN.
SWIVEL JAW SPINDLE AND CHUCK.
APPLICATION FILED JULY 30, 1914.

1,251,986.

Patented Jan. 1, 1918.
3 SHEETS—SHEET 3.

UNITED STATES PATENT OFFICE.

EDWARD J. McCLELLAN, OF NEW YORK, N. Y., ASSIGNOR TO THE GARVIN MACHINE COMPANY, A CORPORATION OF NEW YORK.

SWIVEL-JAW SPINDLE AND CHUCK.

1,251,986.     Specification of Letters Patent.     Patented Jan. 1, 1918.

Application filed July 30, 1914.  Serial No. 854,042.

*To all whom it may concern:*

Be it known that I, EDWARD J. MCCLELLAN, a citizen of the United States, and a resident of New York, in the county of New York and State of New York, have invented a certain new and useful Swivel-Jaw Spindle and Chuck, of which the fololwing is a specification.

This invention relates to monitor-lathes, screw machines, automatic lathes and similar machines in which articles are manufactured by repeated cutting operations with tools. An ordinary simple lathe is limited, in a single operation to turning objects which are round with respect to a single central axis. Similarly the ordinary screw machine and turret or monitor-lathe have definite limitations. For example, an object like a cube or prism could not be worked upon in an ordinary monitor-lathe or screw machine on more than one of its faces in one operation. Work upon the other faces would have to be done in succession by taking the article out of the lathe and re-chucking it.

This ordinarily requires putting the articles in a series through one operation, then commencing again and going through the series with another operation, etc., consuming time in proportion to the number of operations. Thus an article like a gas cock, having boring, reaming, facing and tapping operations from three or more sides would necessitate at least three operations with an ordinary screw machine or monitor-lathe. It is therefore desirable to increase the field and widen the limitations of these machines, and the present invention is directed to such an improvement.

It is, of course, not sufficient to merely provide for the motions in an abstract and theoretical way, because the cutting and working of metal at high speeds calls for great applications of force and the rigidity and strength and power of the mechanism must be adapted to resist such heavy applications of force without either yielding or vibration. The slightest yielding or vibration under any one of the great variety of forces imposed makes the work lose accuracy and finish, damages the tools, and greatly interferes with the efficiency of their action. Accordingly, the provision of adequate strength and rigidity to withstand every condition of practice is a matter of prime importance and constitutes an important part of the invention. Unless every feature can be carried out without any sacrifice of solidity and perfect rigidity, the machine tool will not be operative from a practical standpoint. It is particularly the purpose of the present invention to provide adequate solidity, strength and rigidity under all conditions, while carrying out the improved purposes first mentioned. With these objects in view the invention consists in the features of construction and combination as hereinafter set forth.

Constructions embodying the invention will include a chuck having jaws 1 between which the work may be grasped. These jaws will have a movement to clamp upon the work, and in addition will have other movements adapted to rotate or otherwise move the work during a single clamping engagement, from one position to another, to the end that the tools may act on different faces of the work, all however as part of the same operation. 2 designates a lathe spindle, and as a convenient chuck operating means there is best provided a tube 3, hereinafter referred to as a draw tube, extending through this spindle 2. This draw tube or means has connections for moving the jaws 1 toward one another so as to clamp upon the work.

In the constructions illustrated in the drawings, a draw-block 4 is slidable axially of the chuck and is provided with two flat faces 5, each of which has a series of inclined grooves or ways 6, the grooves or ways on one face being inclined oppositely to those on the other face. Engaging each flat face of this drawblock are correspondingly flattened faces on extensions 7 of the jaws 1, these faces further having ribs 8 which enter the grooves or ways 6 referred to. In order to provide for the engagement just mentioned and at the same time to permit the jaws to be located opposite one another on a common axis, the extensions 7 are carried inward from the sides of the respective jaws to be forced apart or forced toward one another by an endwise movement of the draw tube and draw-block. It is, however, important to secure this movement without sacrifice of rigidity and this is accomplished in the preferred construction illustrated in Figs. 7, 8 and 9 in the following way.

The best practical construction embodying the invention will have guiding ways for the jaws which constitute an important feature of the invention, so that the jaws may have an easy movement in their guides, without being cramped or bound therein, when being clamped upon a piece of work. This is particularly valuable when the jaws project considerably from the face of the chuck, in other words, having what may be described as a considerable overhang on the work, which results in a special tendency to cramp the jaws in their guides unless means are adapted to prevent this. Moreover, the guides for the jaws are adapted to secure great strength and rigidity not only in a direction parallel to the movement of the jaws, but also transversely and in separate directions both inward and lateral. The feature just mentioned, relating to securing rigidity in two directions across the path of movement of the jaws, results in securing rigidity across the face of the chuck, besides in a direction inward or parallel to the axis of rotation thereof. The elimination of any lateral yielding or rocking of the jaws on the face of the chuck is independent of the features by which inward or longitudinal rigidity is imparted. These various features, relating to the guiding of the jaws of the chuck are in many cases independent of the other features by which the jaw heads have a swiveling movement. For this reason, and in the interest of greater clearness, the swivel head features have been largely omitted from the drawings of Figs. 7, 8 and 9, wherein the best practical construction of guiding the chuck jaws is illustrated in detail.

Figure 7:
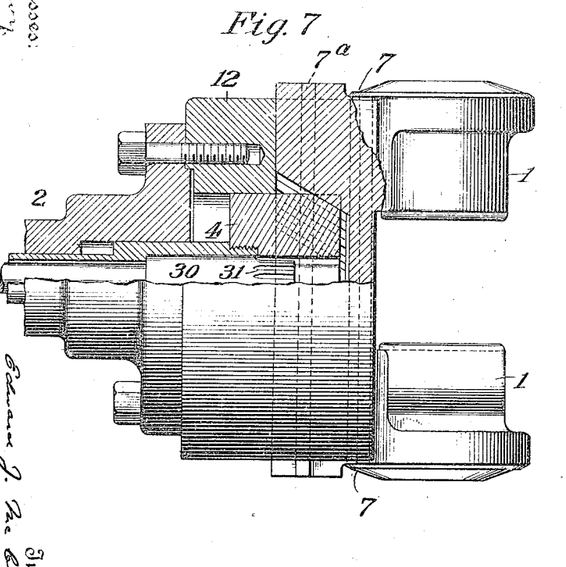
Fig. 7 is a side elevation partly in section of a chuck corresponding in all its main features to the embodiment of the invention shown in Figs. 1 to 4 inclusive, but having an improved construction of guiding ways.
Figure 8:
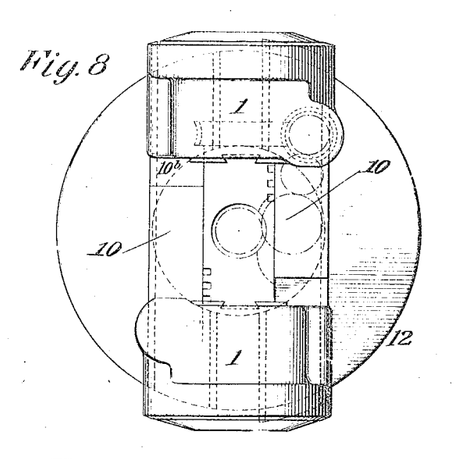
Fig. 8 is a front elevation of the same.
Figure 9:
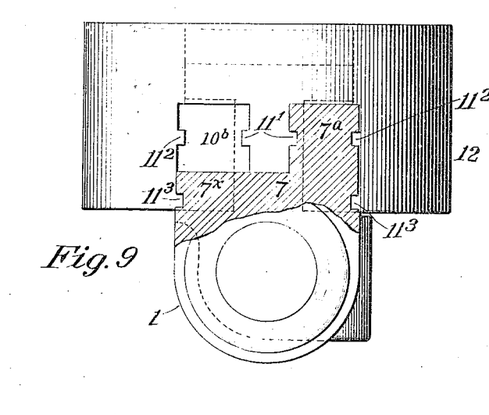
Fig. 9 is a top view, with respect to Fig. 7, partly in section.

The extensions or bases 7 of the jaws as just described, having the flat faces and ribs 8 which engage the respective flat faces 5 and grooves 6 of the draw-back 4, are, in accordance with Figs. 7, 8 and 9, prolonged or carried in part entirely across the body of the chuck, as at 10, nearly to the extent of the full diameter thereof. Under these conditions these jaw bases or extensions 7, prolonged at 10, lap past or clear one another and their prolongations 10 are sufficiently offset laterally from one another to obtain this result. The position of these jaw bases or extensions and their prolongations is also such as to obtain additional functions hereafter pointed out. It will be understood that the jaws are alike and interchangeable, their different appearance in different views being merely due to the different positions they happen to assume relative to one another.

Referring to Fig. 9 the top or visible jaw is shown with its extension or base, here denoted $7^a$ extending downward, and prolonged in fact practically across the entire diameter of the chuck. The under or practically invisible jaw in Fig. 9 has its extension or base similarly prolonged clear across the whole diameter of the chuck, and appearing at $10^b$. It will be observed from Fig. 9 that each jaw extension or base exemplified by $7^a$ of the upper jaw, has three guides, afforded by the tongues or ways $11'$, $11^2$ and $11^3$. This extension or base is however not guided by all three tongues or ways $11'$, $11^2$ and $11^3$ throughout the prolongation thereof. The prolongation 10 of the extension or base has only the guiding tongues or ways $11'$, $11^2$. This is due to the fact that each jaw extension or base will, in the best constructions, have a lateral part $7^x$ which projects adjacent to the prolongation (see $10^b$ of Fig. 9) of the other jaw. This part $7^x$ will be guided on the tongue or way $11^3$, which tongue or rib, at a different portion of its length affords the third guide for the extension or base of the other jaw (the under jaw in Fig. 9) just as the upper jaw in this figure is actually shown to be guided. The lateral separation of the respective jaw prolongations is sufficient to receive the drawblock 4 having the ribs thereon as already described engaging corresponding ribs to operate the jaws.

It will be observed that in accordance with the above, each jaw has what has been termed an extension, denoted 7, being really the rear part or base of the jaw itself, which is comparatively broad, in fact as broad as the jaw itself, and such extension runs in guides of the casing on both sides thereof, these guides being common to both jaws. In other words, the extension or base 7 of each jaw is guided on both sides by ways which are also a common guiding means for the extension or base of the other jaw, acting in a precisely similar way for both jaws. This guiding means secures great lateral rigidity and braces the jaws against any lateral yielding. But in addition to such extension or base 7, each jaw has a prolongation of the extension or base which extends clear across the whole diameter of the chuck, or substantially so, and these prolongations have individual guides in the chuck casing which are not common to the other jaw. These prolongations, which make the jaw guided clear across the whole diameter of the chuck, give the jaws great longitudinal stiffness, and brace them against any longitudinal yielding. In this way the jaws are given a free movement and are permitted to clamp the work without binding on their ways. By both features in combination the jaws are given the combined features of longitudinal, inward, and lateral stiffness, as first pointed out above. Each jaw will have a swivel head, if desired, and means for operating the same in constructions containing the full practical embodiments of the whole invention.

Before referring to these latter features, however, mention may be made of an alternative type of guide for the jaws, illustrated in Figs. 1 to 4 inclusive, to which type for convenient illustration, the swivel head features have been exclusively illustrated in their details. It will of course be understood that these swivel head features are equally applicable to either form of chuck, i. e. that of Figs. 7, 8 and 9 or Figs. 1 to 4 inclusive, and Figs. 5 and 6 are generally illustrative of either type of chuck, with such swivel head features, and operating means therefor, applied.

In Figs. 1 to 4 inclusive each jaw has a guide rod 10' firmly secured thereto, which guide rod is preferably carried directly through the heavier part 7 of the jaw extensions just described, projecting out a certain distance at each end. These guide rods are therefore part of the chuck jaws and are carried outward through suitable guiding holes 11' formed in the frame or casing 12 of the chuck. The location of the guiding holes or bushings in this way, separated by the greatest possible distance, and made part of the solid chuck casing 12, obtains the greatest possible rigidity, and freedom from looseness resulting from any slight wear. Moreover, the force put on the bearings by the sliding movement of the jaws is greatly lessened by this considerable separation of these guiding bushings. In addition to being guided in this way, each jaw has an additional sliding engagement 13 on the guide rod 10' of the other jaw, and corresponding to the lateral extension or base 7× of Figs. 7, 8 and 9. This sturdily resists any tendency of the respective jaws to swivel upon their guide rods. In other words, the jaw is braced laterally just as is done in another way by the form of Figs. 7, 8 and 9.

The jaws project out for a considerable distance from the face of the chuck, as already mentioned, to the end that a sufficient depth of space may be provided between them to engage a variety of work. This condition would set up binding strains and would also cause wear, except for the comparatively long guide rods 10', or equivalent prolongations 10 in Figs. 7, 8 and 9, which control the movement of the jaws. This cross projection of the jaws is therefore a further factor related to the means for securing stiffness in the guiding of the jaws. It will, however, be understood that the guiding means for the jaws are to a large extent independent of other features of the invention hereinafter described, and as to these other features, other jaw guiding means may be substituted, such for example, as set forth in our prior Patent No. 927,424.

Each jaw carries a swivel head, the two heads swiveling on a common axis, preferably diametrically of the chuck, and means will be provided for swiveling one or both of the heads, and in accordance with the present invention this swiveling is accomplished without arresting the rotation of the chuck with the attendant loss of time and power which would result from stopping the rotation to swivel the jaws. Furthermore, the jaws are adapted to swivel without releasing their clamping pressure on the work, which is very important in that any release of the pressure might permit a slight shifting in the position of the work after the tools had worked on one part and before the tools engaged another part. This shifting would be fatal to accuracy. As a means of permitting the heads 20, 21 to swivel while under the clamping pressure, each head has a cylindrical body fitting a correspondingly cylindrical recess in the jaws 1 and a cap or flange 22 fitting a somewhat enlarged annular cavity 23 formed by a suitably recessed screw cover 23' of the jaw. This screw cover has a centrally hardened plate 24, and a similar hardened plate may be embedded in each rotatable head in a suitable central or axial deposition thereof. This leaves a cavity 25 with hardened races in which balls 26 are placed to take the thrust due to the clamp of the work while the heads are swiveling. Each head has a suitable slot 27 or the like on its face to receive any special fixture for holding any particular piece of work.

The means thus far described provide for the holding of the work and swiveling the same into different positions, but do not provide for fixing the work in any particular position nor for turning the work from one position to another without stopping the rotation of the chuck. These latter features constitute an important part of the invention, and in the best constructions include mechanism operated from within the spindle. A rod 29 is illustrated extending through the draw tube 3 and having an enlarged plug or arbor 30 guided to turn in the end of the draw tube and being cut with teeth to form a gear 31 at the point where it projects from the draw tube. The train of gears, 32, 33, 34, each on rigid axles extending into suitable bushings in the extensions 7 of one of the jaws 1, mesh with the first mentioned gear 31 and terminate in a worm 35 within the jaw, which worm projects somewhat into the cylindrical recess thereof so as to mesh with a worm gear 36$^m$ preferably integrally cut upon the swivel head 20 of this jaw. The result of turning the rod 29 within the draw tube is to transmit rotation through the chain of gears just described and rotate the swivel head 20. But, inasmuch as the chuck as a whole is in continuous and normal rotation, the same effect is obtained by holding the rod 29 stationary, in which case the gears planetate around the temporarily motionless central gear 31 and transmit a rotative movement to the swivel head of the chuck, as long as the latter rotates while the rod is being held stationary. This rod 29 can be held stationary in any suitable way as by a brake, or by a simple handle at its exposed end, which may be grasped and held stationary as long as desired. Without the application of such holding means however, the rod naturally rotates with the rest of the chuck and the swiveling movement of the head does not take place. It is sufficient to transmit movement to one head since the work is held firmly between the two heads, causing them to rotate in unison.

The important feature of the operation just described is of course the presence of a gear which has its teeth concentric to the axis of rotation of the chuck, to the end that such gear may rotate in unison with the chuck, or else be held stationary while a gear on the chuck meshes or runs on the teeth of the now stationary gear. This being true it is of course not necessary that said gear concentric with the axis of the chuck be always a small gear or pinion inside the chuck. It may be of any size. It is obvious that such an external gear will serve the same purposes and results, or substantially the same purposes, as the pinion 31. In every case there is a gear concentric with the axis of the chuck, the further details as just referred to being relatively of minor importance.

The proper swivel positioning of the heads is not necessarily effected in the absence of some special positioning means, and the locking of the work in definite positions is correspondingly a matter of importance. In order to secure this result, one of the swivel heads, preferably that having the worm drive as just described, may also be provided with a plurality of recesses 37 located at regular or irregular angular intervals adapted to the work. For example, recesses at 90 degree intervals would be suitable for work requiring machining on four faces, like the four side faces of a cube. But work requiring machining on axes 45 degrees apart, or any other regular or irregular arrangement, may be provided for by replacing one recessed cap 22 by another, which can be readily done by unscrewing the cover plate 23' at the end of the jaw. The recessed cap 22 is shown secured in place by screws 38 so as to be removable, permitting the adjustment mentioned. While the recesses 37 may be formed in many different ways, and various forms of locking means used, a convenient arrangement consists in a lock pin 40 guided in a hole parallel to the axis of the swivel heads and working against the under flat face of the recessed cap 22. The recesses may have a deep square shoulder 37$^a$ on one side and a shelf 37$^b$ terminating in an incline 37$^c$ on the other side. The lock pin 40 is shown with a rectangular end adapted to fit the recesses 37 closely, and is held against swiveling on its own axis by a transverse pin 41 projecting into a slot 42 of the jaw 1. The lock pin has a reduced cylindrical extension 43 surrounded by a coil spring 44 bearing against a fixed plug or anchorage 45 and pressing the lock pin constantly in a direction to enter the recesses 37. In this construction 47 designates a bell crank lever pivoted in a cavity 48 of the jaw 1 adjacent to the extension 7 thereof and adapted to be rocked by a second rock lever 49 whose path of movement extends radially inward of the chuck into the path of movement of an extension 50 of the arbor 30 already described, which in turn forms part of the main operating rod 29 within the spindle. By projecting the rod therefore, in this construction, the rock lever 49 operates the bell crank lever 37 and pulls the lock pin 40 out of engagement with its locking recess 37. If therefore the rod is held against turning, the heads will swivel as already described. This swiveling will continue until the locking pin again drops into a locking recess, and the certainty of this latter result is greatly increased by the depressed shelf 37$^b$ of the locking recess as already described. Accordingly, the swivel heads are given repeated angular movements through a definite range and are thereupon locked firmly in fixed positions, all without releasing their clamping engagement on the work, and without stopping the rotation of the chuck. The usual tools of the screw machine or monitor-lathe may be brought to bear on the respective faces in the prescribed order.

Figures 1, 3:
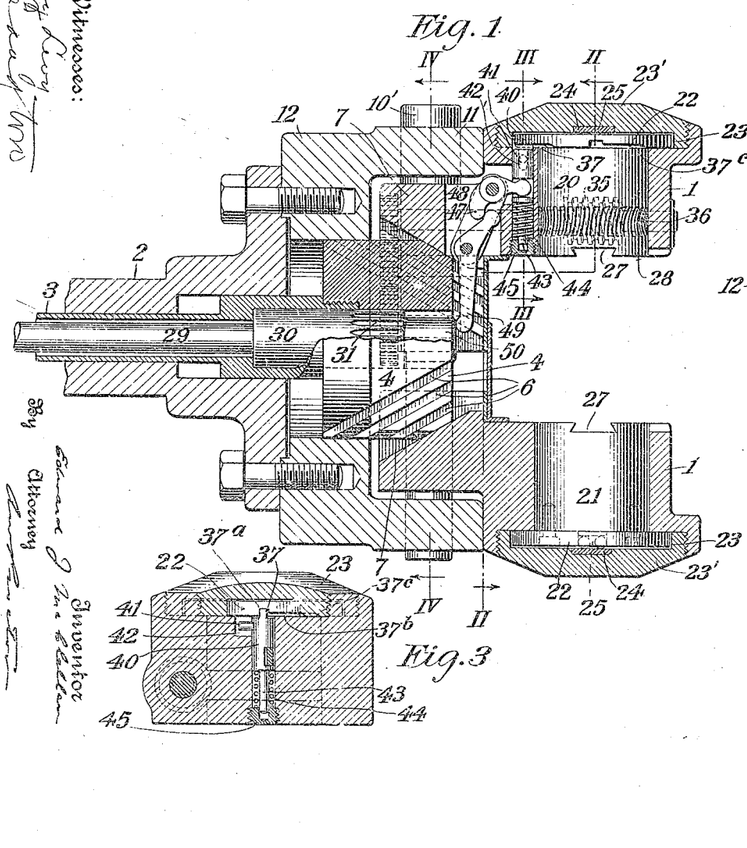
Figure 1 is a longitudinal sectional view showing part of a spindle and chuck construction embodying the principles of this invention.
Fig. 3 is a section on the line III—III of Fig. 1 looking in the direction of the arrows.
Figure 2:
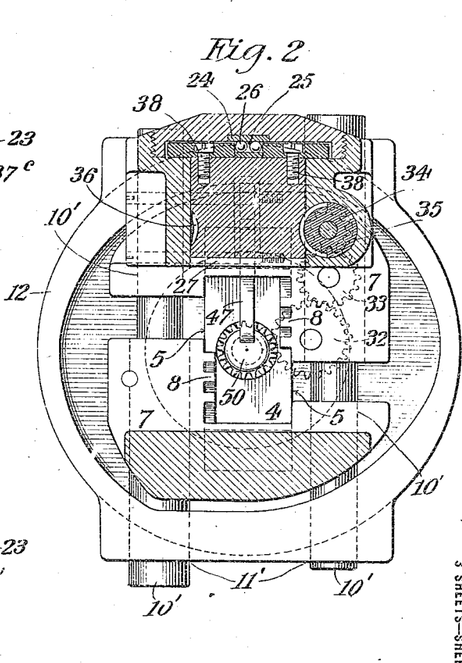
Fig. 2 is a sectional view on the line II—II of Fig. 1 looking in the direction of the arrows.
Figures 4, 5, 6:
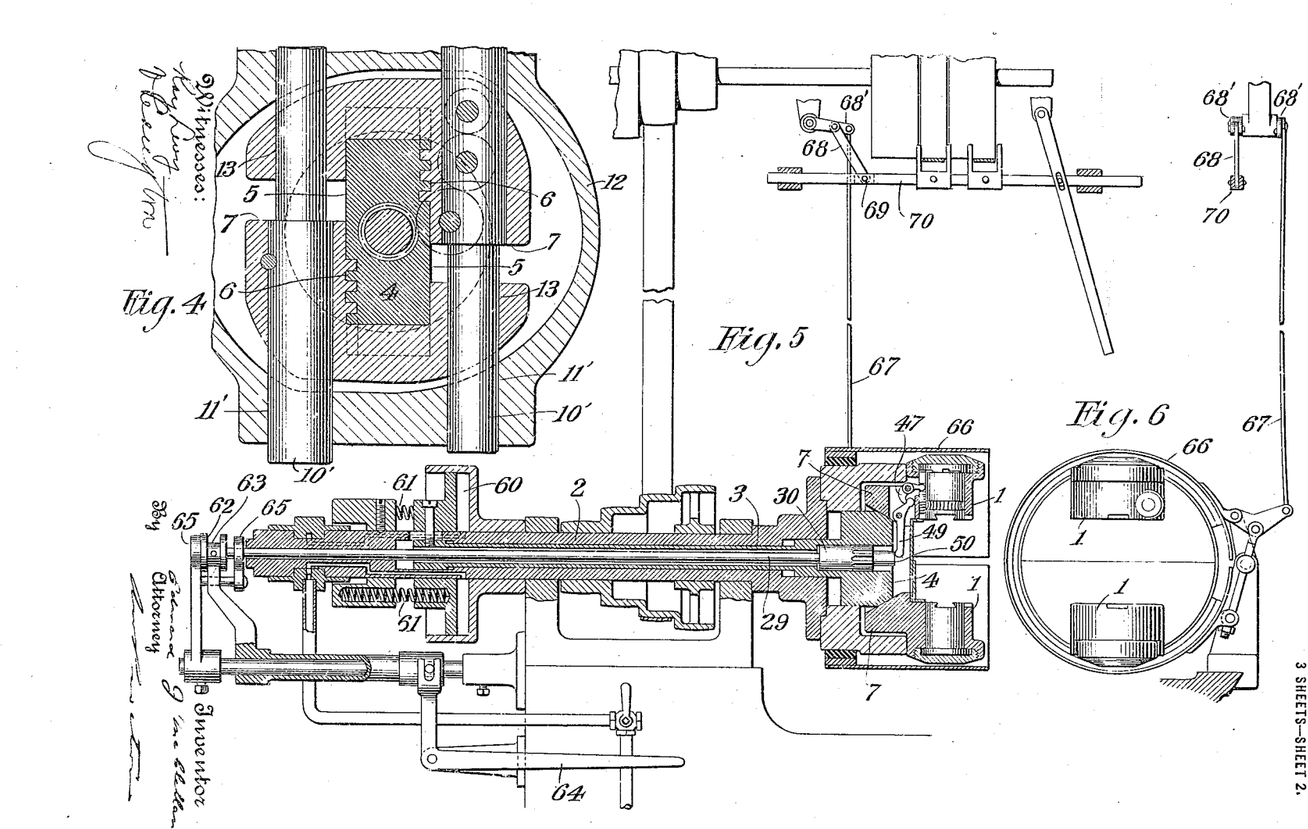
Fig. 4 is a section on the line IV—IV of Fig. 1 looking in the direction of the arrows.
Fig. 5 shows the complete spindle and its operating parts, partly in section.
Fig. 6 is an end view, certain of the parts being broken away for clearness.

The foregoing constructions provide for all the main operations as hereinafter referred to, except in so far as the movements of the controlling rod are secured. As already stated this may be obtained by the operator himself, who can first press the rod inward and then grasp it against rotation until the swiveling heads come into a locking position, whereupon the rod will commence to rotate with the chuck, slipping in the operator's hand. It is, of course, understood that the operator in the meantime has allowed the rod to move longitudinally enough to permit the lock pin to reënter the locking recess. But as this manipulation is not always entirely convenient it becomes desirable to accomplish it mechanically or automatically by the movement of a single lever for example. Also, it will be evident that the considerably projecting jaws are somewhat dangerous, the momentum being considerable, and their radial projection rather exposed. In order to provide for these features a few more or less diagrammatic figures of the drawings are furnished, showing a simple construction for accomplishing the result. It will be observed that the draw tube is here operated by a fluid pressure cylinder 60 concentrically mounted on the lathe spindle 2. The fluid pressure is then made to propel the draw tube 3 in a direction to clamp the work. When the fluid pressure is released the draw tube is moved in the opposite direction by a plurality of springs 61 arranged about the draw tube. The controlling rod 29 has a disk or disks 62 fixed thereto adapted to receive the thrust of a non-rotatable disk or disks 63 controlled by a lever 64, the disks 62 being thereby forced against a fixed disk or disks 65. In this way the motion of the lever 64 thrusts the controlling rod 29 in one direction or the other, and at the same time applies a braking influence on account of the engagements of the disks 62, 63 and 65. This accomplishes the movements already described automatically, that is to say by the mere to and fro movement by the controlling lever 64. A further brake sleeve 66 is illustrated surrounding the chuck casing and having a projecting portion which affords a guard around the rapidly flying jaws. This brake is conveniently applied by the pull of a rod 67 attached to lever extension 68' attached to link 68, the link-joint 69 being attached or connected to the belt shipper 70. In this way the movement of the belt shipper in either direction to start the spindle in either direct or reverse rotation, according to the usual practice, results in releasing the pull on the brake rod 67 so that the brake is released. When however the belt shipper is moved to its middle position to stop the rotation of the spindle the toggle joint is moved so as to apply tension to the brake rod and set the brake and promptly stop the spindle.

The whole operation is therefore as follows:—

The operator takes a piece of work, for example a rough casting, and places it more or less roughly in position between the two chuck jaws. The fluid pressure is then turned on, causing the jaws to come together with force, and clamp the casting in a fixed position with respect to the swivel heads, which relative position continues throughout the entire further work on the article. The belt shipper is then pushed to start the spindle in rotation, simultaneously releasing the brake as just described, and the usual turret (not shown) is made to accomplish as many operations on a single axis of the work as may be required, whereupon the lever 64 is pushed over and back, (but without the operator simultaneously having the trouble of manipulatitng the belt shipper) which accomplishes the changing of the position of the work to a new axis in the chuck. The turret moving and jaw swiveling as described, are repeated as many times as necessary, whereupon the belt shipper is thrown to apply the brake, stop the rotation of the spindle, and the air pressure released so as to permit the removal of the finished piece. In view of the fact that the manipulation necessary for these purposes is of a very simple character, capable of being done by any one, it is not necessary to make the machine any further automatic, for example, by providing cams for working the proper levers in the proper sequence, as is done with automatic screw machines. It will, however, be seen that the machine is substantially automatic for the purposes of manufacturing certain more or less complicated articles complete, from start to finish in one operation, and requiring only the comparatively unskilled superintendence of an operator to put in the rough castings and take out the finished work, with the incidental operation of the described controlling means. Also it will be observed that there is no loss of time, resulting in an unnecessary cost. The manufacture of the articles is accomplished as rapidly as possible.

What is claimed is:—

1. The combination of jaws, displaceable heads in said jaws, means for clamping the jaws on a piece of work, a spindle, and means extending through the spindle for changing the position of said heads in the jaws while the latter are clamped upon the work.

2. The combination of jaws, swiveled heads in said jaws, means for clamping the jaws on a piece of work, a spindle, and means extending through the spindle for swiveling said heads in said jaws while the latter are clamped upon the work.

3. The combination of jaws, swiveled heads in said jaws, means for clamping the jaws on a piece of work, a spindle, means extending through the spindle for swiveling said heads in said jaws while the latter are clamped upon the work, and means for locking and unlocking said heads in said jaws.

4. The combination of jaws, swiveled heads in said jaws, means for clamping the jaws on a piece of work, a spindle, means coaxial with the spindle for swiveling said heads in said jaws while the latter are clamped upon the work, and means extending through the spindle for locking and unlocking said heads in said jaws.

5. The combination of jaws, displaceable heads in said jaws, means for clamping the jaws upon a piece of work, a spindle, and means extending through the spindle for displacing said heads in the jaws while the latter are clamped upon the work.

6. The combination of jaws, displaceable heads in said jaws, means for clamping the jaws upon a piece of work, a spindle, a gear coaxial with the spindle for displacing said heads in the jaws while the latter are clamped upon the work, and means for locking and unlocking the heads in said jaws.

7. The combination of jaws, displaceable heads in said jaws, means for clamping the jaws upon a piece of work, a spindle, a gear coaxial with the spindle for displacing said heads in the jaws while the latter are clamped upon the work, and means extending through the spindle for locking and unlocking the heads in said jaws.

8. The combination of jaws, swiveled heads in said jaws, means for clamping the jaws on a piece of work, a spindle, and means extending through the spindle for locking and unlocking said heads in the jaws and for swiveling the heads from one position to another.

9. The combination of jaws, a spindle, swiveled heads in said jaws, means carried by the spindle for clamping the jaws on a piece of work, and means extending through the spindle for locking and unlocking said heads in the jaws and for swiveling the heads from one position to another, while the chuck is continuing its normal movement of rotation.

10. The combination of jaws, swivel heads in said jaws, a lathe spindle, means carried by the spindle for forcing said jaws toward one another, a worm gear forming part of one of the swivel heads, a plurality of gears intermeshing with one another and driving said worm gear, and means coaxial with the spindle for causing said gears to planetate and swivel said heads without stopping the rotation of the spindle.

11. The combination of jaws, swivel heads in said jaws, a lathe spindle, a train of gears in one of said jaws for turning one of the swivel heads on its axis, and a rod having a gear extending through said spindle, whereby said gears may be made to planetate and rotate said swivel heads.

12. The combination of jaws, swivel heads in said jaws, a lathe spindle, a train of gears having rigid axles in one of said jaws for turning one of the swivel heads on its axis, and a rod having a gear extending through said spindle, whereby said gears may be made to planetate and rotate said swivel heads.

13. The combination of jaws, swivel heads in said jaws, a lathe spindle, means carried by the spindle for forcing said jaws toward one another, a ball thrust for the respective heads, a train of gears in one of the jaws for rotating said heads.

14. The combination of jaws, swivel heads in said jaws, a lathe spindle, means carried by the spindle for forcing said jaws toward one another, a ball thrust for the respective heads, a train of gears in one of the jaws for rotating said heads, and a lock pin.

15. The combination of jaws, swivel heads in said jaws, a central or axial rod having a gear, a train of gears meshing therewith for rotating one of said heads, and means actuated by longitudinally moving said rod for locking and unlocking one of the heads.

16. The combination of jaws, swivel heads in said jaws, a lathe spindle, means carried by the spindle for forcing said jaws toward one another, a central or axial rod having a gear, a train of gears meshing therewith for rotating one of said heads, and means actuated by longitudinally moving said rod for locking and unlocking one of the heads.

17. The combination of jaws, swivel heads in said jaws, a lathe spindle, a draw tube extending through the spindle, inclined ways for forcing said jaws toward one another, a rod extending through said draw tube, and means actuated by said rod for rotating said heads in the jaws.

18. The combination of jaws, swivel heads in said jaws, a lathe spindle, a draw tube extending through the spindle, inclined ways for forcing said jaws toward one another, a rod extending through said draw tube, and means actuated by said rod for locking and unlocking the heads in the jaws.

19. The combination of jaws, swivel heads in said jaws, a lathe spindle, a draw tube extending through the spindle, inclined ways for forcing said jaws toward one another, a rod extending through said draw tube, and means actuated by said rod for locking and unlocking the heads in the jaws, and rotating the heads in the jaws.

20. The combination of jaws, swivel heads in said jaws, a rod for rotating said heads when the rod is held stationary and locking and unlocking said heads when the rod is moved longitudinally.

21. The combination of jaws, swivel heads in said jaws, a lathe spindle, means carried by the spindle for forcing said jaws toward one another, a rod extending through the spindle for rotating said heads when the rod is held stationary and locking and unlocking said heads when the rod is moved longitudinally.

22. The combination of jaws, swivel heads in said jaws, a lathe spindle, a rod extending through said spindle having a gear, means for rotating the heads in the jaws when said gear is held stationary, and levers in one of said jaws for locking and unlocking the head thereof, one of said levers extending into the path of longitudinal movement of said rod.

23. The combination of jaws, swivel heads in said jaws, a lathe spindle, means carried by the spindle for forcing said jaws toward one another, a rod extending through said spindle having a gear, means for rotating the heads in the jaws when said gear is held stationary and levers in one of said jaws for locking and unlocking the head thereof, one of said levers extending into the path of longitudinal movement of said rod.

24. The combination of jaws, swivel heads in said jaws, a lathe spindle, a chuck casing, extensions fixed to the respective jaws, and slidable in the chuck casing, each jaw lapping past the extension of the other jaw.

25. The combination of jaws, swivel heads in said jaws, one of the heads having a flange formed in its inner face with recesses 37ᵃ with a depressed shelf, 37ᵇ and an inclined portion 37ᶜ, means for turning said head in the jaw, and a lock pin movable in the direction of the axis of the head to enter said recesses.

26. The combination of jaws, swivel heads in said jaws, one of the heads having a flange with recesses, a lock pin guided in said jaw, a bell crank lever engaging said lock pin, and a rock lever extended to the axis of the chuck and engaging said bell crank lever.

27. The combination of jaws, swivel heads in said jaws, one head having a worm gear thereon, a worm having a shaft extending through said jaw, a train of gears driving said worm shaft, and a rod having a gear extending into the center of the chuck.

28. The combination of jaws, swivel heads in said jaws, one head having a worm gear thereon, a worm having a shaft extending through said jaw, a train of gears driving said worm shaft, and a lock pin adapted to be displaced in said jaw for locking and unlocking said head.

29. The combination of jaws, swivel heads in said jaws, a lathe spindle, means carried by the spindle for forcing said jaws toward one another, a rod extending through said spindle for rotating said heads and locking and unlocking the same, and means for controlling the movement of the rod.

30. The combination of jaws, swivel heads in said jaws, a draw tube for forcing said jaws toward one another, a rod extending through the draw tube for rotating the heads in the jaws and locking and unlocking the same, a plurality of stationary disks coöperating with portions of said rod, and means for operating said disks to control the movements of said rod.

31. The combination of jaws, swivel heads in said jaws, a draw tube for forcing said jaws toward one another, a rod extending through the draw tube for rotating the heads in the jaws and locking and unlocking the same, said rod having a plurality of disks or collars thereon, non-rotatable disks coöperating to displace the rod longitudinally and apply braking forces thereon, and means for controlling the latter disks.

32. The combination of jaws, swivel heads in said jaws, a lathe spindle, devices carried by the spindle for forcing said jaws toward one another, means for rotating said heads in the jaws and locking and unlocking the same, and a lever having a connection for moving said means longitudinally and for applying a braking force thereto.

33. The combination of jaws, swivel heads in said jaws, a lathe spindle, a draw tube extending through the spindle for forcing said jaws toward one another, a fluid pressure means controlling said draw tube, a rod extending through the draw tube for rotating said heads in the jaws and locking and unlocking the same, means having a to and fro movement for displacing said rod longitudinally, and means acting on the rod when it is moved longitudinally for applying a braking force thereto.

34. The combination of jaws, swivel heads in said jaws, a lathe spindle, a draw tube, fluid pressure means for operating said draw tube, a rod extending through said draw tube and capable of having a longitudinal and rotary movement with respect to the spindle, means for rotating said heads in the jaws, and locking and unlocking the same under the respective movements of the rod, and means for having a to and fro movement in giving such movements to the rod.

35. The combination of jaws, a lathe spindle, an air cylinder on the spindle substantially adjacent to said jaws and operating the same, and means extending through the spindle for swiveling said jaws.

36. The combination of jaws, swivel heads in said jaws, a lathe spindle, an air cylinder substantially adjacent to said jaws for operating the same, and means extending through the spindle for causing the rotation of said heads in said jaws.

37. The combination of jaws, swivel heads in said jaws, a lathe spindle, an air cylinder substantially adjacent to said jaws for operating the same, and means extending through the spindle for causing the rotation of said heads in said jaws, and for locking and unlocking said heads in the jaws.

38. The combination of chuck jaws, swivel heads in said jaws, and means operated by the rotation of the chuck itself for swiveling said heads in said jaws.

39. The combination of chuck jaws, swivel heads in said jaws, means operated by the rotation of the chuck itself for swiveling said heads in said jaws, and means for locking and unlocking the heads in said jaws.

40. The combination of chuck jaws, swivel heads in said jaws, a brake, and means operated by the conjoint action of said brake and the rotation of the chuck itself for swiveling said heads in said jaws.

41. The combination of a chuck casing, jaws extending clear across the diameter of the chuck casing, swiveling heads in said jaws, and a lateral extension of each jaw bearing on the guides of the other jaw.

42. The combination of a chuck casing, jaws extending clear across the diameter of the chuck casing, a lateral extension of each jaw bearing on the guides of the other jaw, swiveling heads in each jaw, and a gear coaxial with the chuck for rotating said swivel heads in said jaws.

Signed at New York, in the county of New York and State of New York, this 28th day of July, A. D., 1914.

EDWARD J. McCLELLAN.

Witnesses:
CHAS. T. LUTHER,
T. A. POWER.